United States Patent
Rhodes

(10) Patent No.: US 7,571,181 B2
(45) Date of Patent: Aug. 4, 2009

(54) NETWORK USAGE ANALYSIS SYSTEM AND METHOD FOR DETECTING NETWORK CONGESTION

(75) Inventor: Lee Rhodes, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 11/021,956

(22) Filed: Dec. 22, 2004

(65) Prior Publication Data

US 2005/0223089 A1 Oct. 6, 2005

(51) Int. Cl.
*G06F 7/00* (2006.01)
*G06F 17/00* (2006.01)

(52) U.S. Cl. .................. 707/102; 709/223; 702/179

(58) Field of Classification Search ........... 707/1–10, 707/100–104.1, 200–206; 705/54; 709/201–203, 709/217, 219, 223–229, 235; 370/252, 447; 718/100–107; 702/179
See application file for complete search history.

(56) References Cited

U.S. PATENT DOCUMENTS

| | | | |
|---|---|---|---|
| 5,867,483 A * | 2/1999 | Ennis et al. ........... 370/252 |
| 6,279,113 B1 | 8/2001 | Vaidya | |
| 6,282,546 B1 | 8/2001 | Gleichauf et al. | |
| 6,405,251 B1 | 6/2002 | Bullard et al. | |
| 6,453,345 B2 | 9/2002 | Trcka et al. | |
| 6,484,203 B1 | 11/2002 | Porras et al. | |
| 6,526,022 B1 | 2/2003 | Chiu et al. | |
| 6,535,227 B1 | 3/2003 | Fox et al. | |
| 6,535,482 B1 | 3/2003 | Hadi Salim et al. | |
| 6,546,493 B1 | 4/2003 | Magdych et al. | |
| 6,600,720 B1 | 7/2003 | Gvozdanovic | |
| 6,662,176 B2 | 12/2003 | Brunet et al. | |
| 6,813,645 B1 * | 11/2004 | Meyer ........... 709/245 |
| 7,506,046 B2 * | 3/2009 | Rhodes ........... 709/224 |
| 2002/0032717 A1 | 3/2002 | Malan et al. | |
| 2002/0035698 A1 | 3/2002 | Malan et al. | |
| 2002/0083175 A1 | 6/2002 | Afek et al. | |
| 2002/0154653 A1 * | 10/2002 | Benveniste ........... 370/447 |
| 2003/0002436 A1 | 1/2003 | Anderson et al. | |
| 2003/0004689 A1 | 1/2003 | Gupta et al. | |
| 2003/0009699 A1 | 1/2003 | Gupta et al. | |
| 2003/0028631 A1 * | 2/2003 | Rhodes ........... 709/224 |
| 2003/0033253 A1 * | 2/2003 | Rhodes ........... 705/52 |
| 2003/0033403 A1 * | 2/2003 | Rhodes ........... 709/224 |
| 2003/0039212 A1 | 2/2003 | Lloyd et al. | |
| 2003/0065409 A1 | 4/2003 | Raeth et al. | |
| 2003/0084349 A1 | 5/2003 | Friedrichs et al. | |

(Continued)

OTHER PUBLICATIONS

Cristian Estan et al., New directions in traffic measurement and accounting, Aug. 2002, ACM, 323-336.*

(Continued)

*Primary Examiner*—Jean B Fleurantin

(57) ABSTRACT

A system and method is provided herein for detecting congested locations within a network. The method includes receiving a stream of UDRs from one or more observation points within the network. The method further comprises computing an amount of bandwidth utilized by each UDR as each UDR is received from the observation point, generating a statistical distribution of the UDRs based on the amount of bandwidth utilized by each UDR, and analyzing the statistical to detect a congested location associated with the observation point.

26 Claims, 11 Drawing Sheets

Exemplary network topology and network usage analysis system.

U.S. PATENT DOCUMENTS

| | | | |
|---|---|---|---|
| 2003/0101357 | A1 | 5/2003 | Ronen et al. |
| 2003/0110396 | A1 | 6/2003 | Lewis et al. |
| 2003/0115483 | A1 | 6/2003 | Liang |
| 2003/0115485 | A1 | 6/2003 | Miliken |
| 2003/0115486 | A1 | 6/2003 | Choi et al. |
| 2003/0135759 | A1 | 7/2003 | Kim et al. |
| 2003/0140140 | A1 | 7/2003 | Lahtinen |

OTHER PUBLICATIONS

Polly Huang., A non-instrusive, wavelet-based approach to detecting network performance problems, Nov. 2001, ACM, 213-227.*

M. Fullmer et al., "The OSU Flow-tools Package and Cisco NetFlow Logs," 14th Systems Administration Conf., Dec. 3-8, 2000, pp. 291-303 of the Proceedings. [Online] http://www.usenix.org/events/lisa00/full_papers/fullmer/fullmer_html/index.html.

"NetFlow Services and Applications," Mar. 1999, Copyright 1992 Cisco Systems, Inc., 27pp. [Online] http://www.cisco.com/warp/public/cc/pd/iosw/ioft/neflct/tech/napps_wp.htm.

N. L. Rhodes, "Internet Usage Analysis System and Method," U.S. Appl. No. 09/548,124, filed Apr. 12, 2000, 56 pp.

S. Jagannathan et al., "A Revenue-Based Model For Making Resource Investment Decisions In IP Networks," Integrated Network Management, 2003, IFIP/IEEE Eighth International Symposium, Mar. 24-28, 2003, pp. 185-197.

* cited by examiner

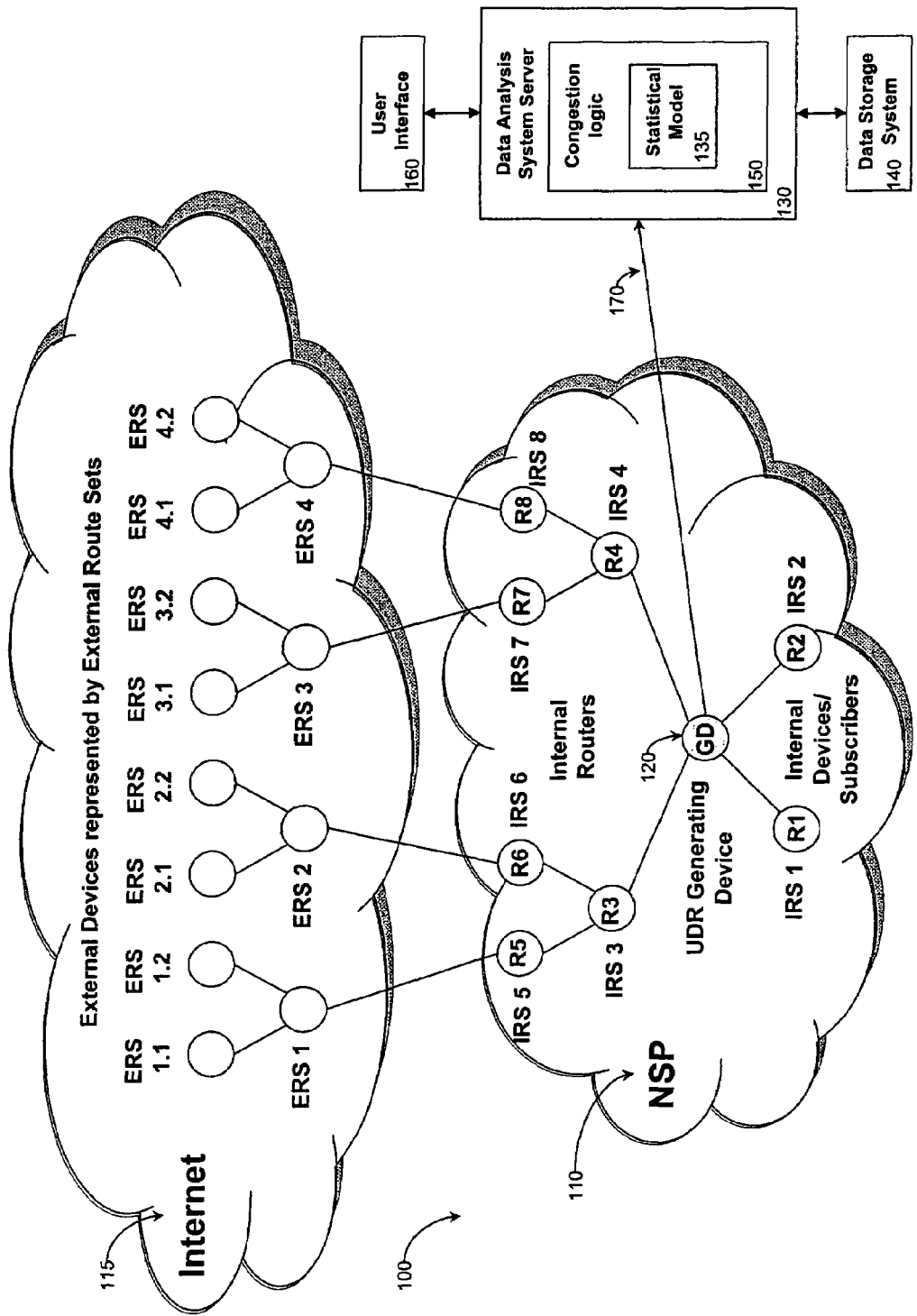
Figure 1: Exemplary network topology and network usage analysis system.

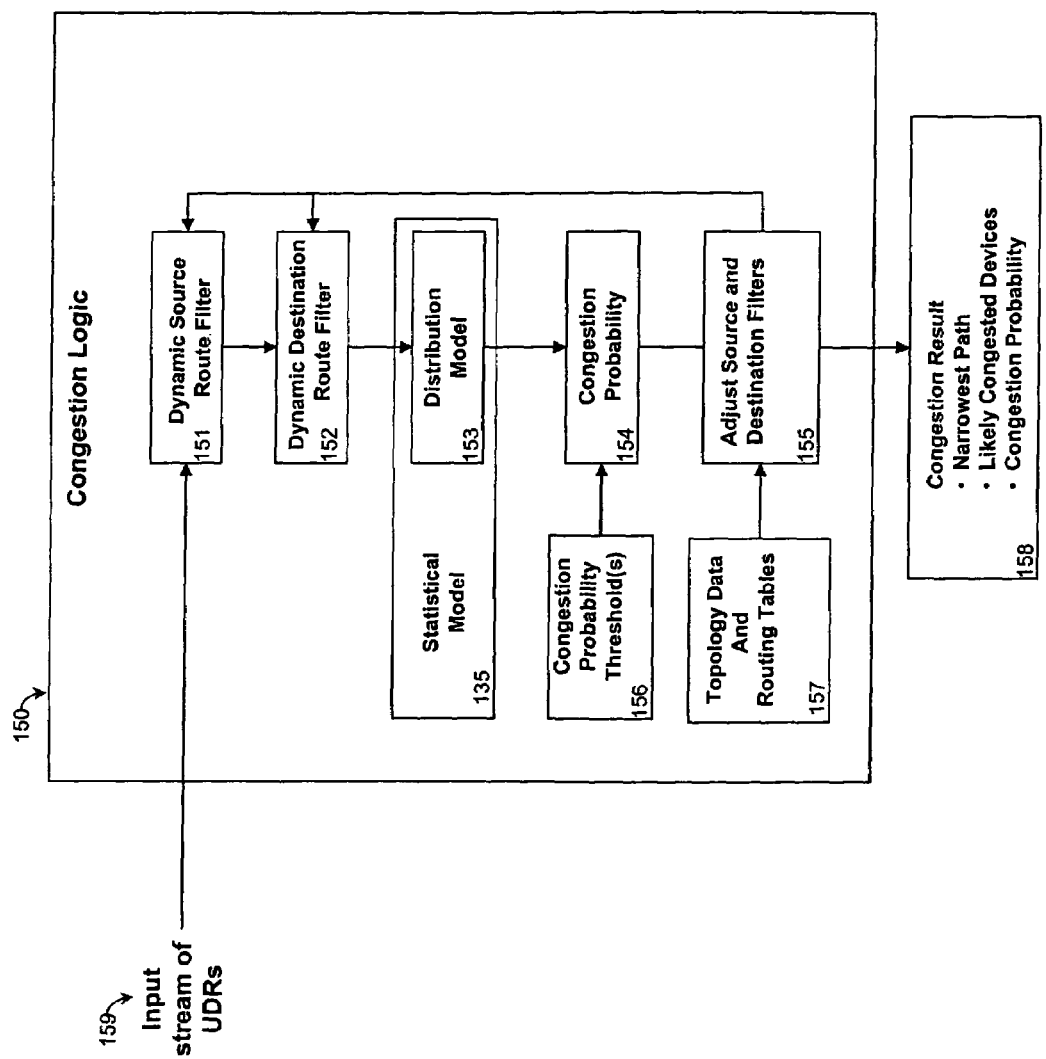
Figure 2: Detail of congestion analysis components.

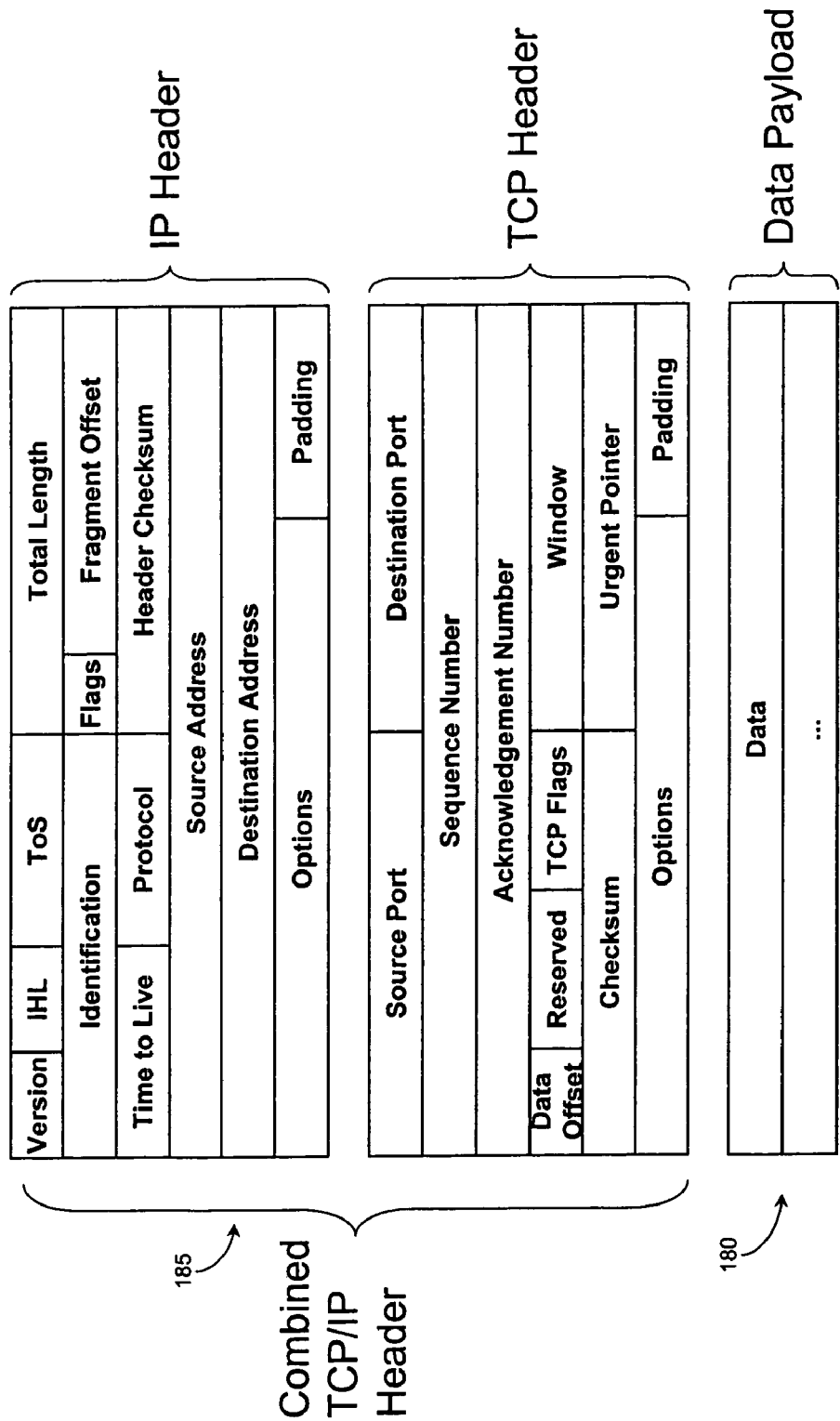
Figure 3: Structure of TCP/IP header fields and Data Payload fields

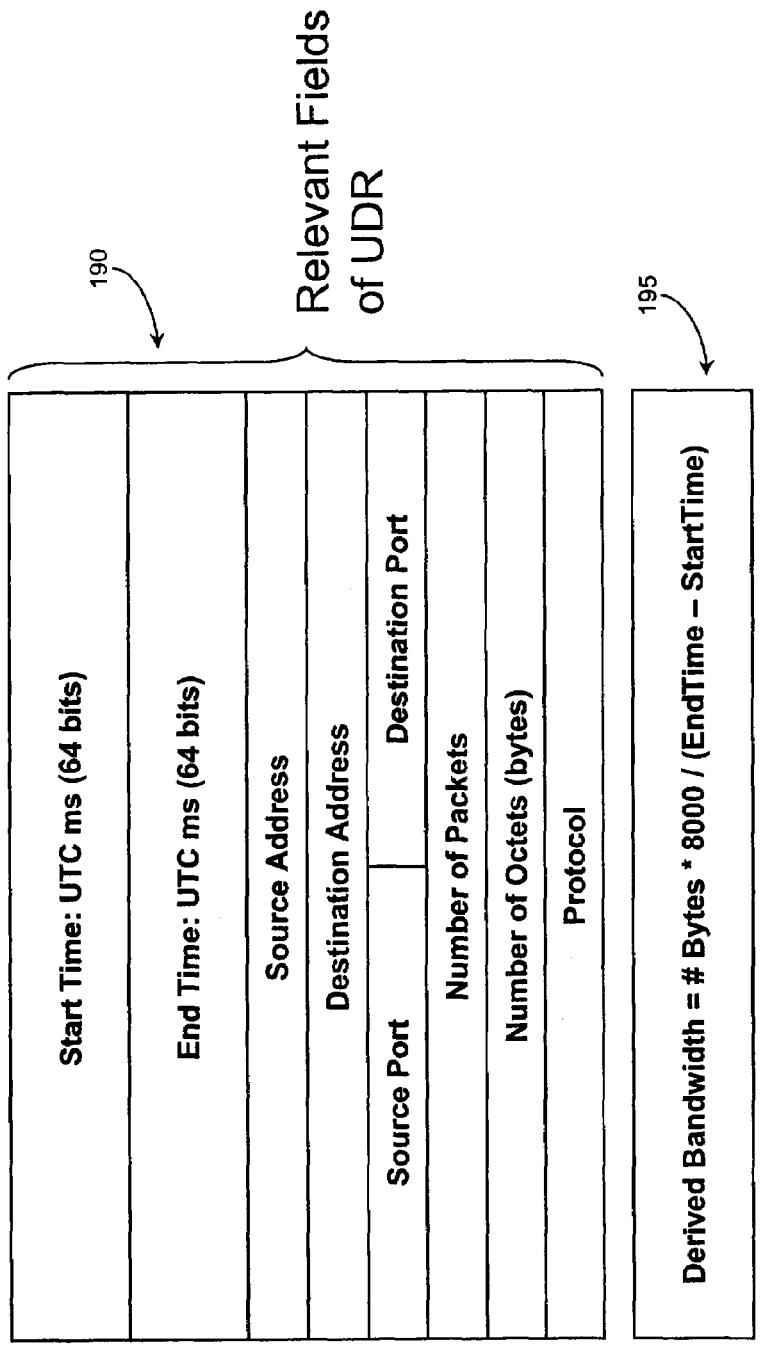
Figure 4: Relevant Fields of a Usage Detail Record plus derived bandwidth.

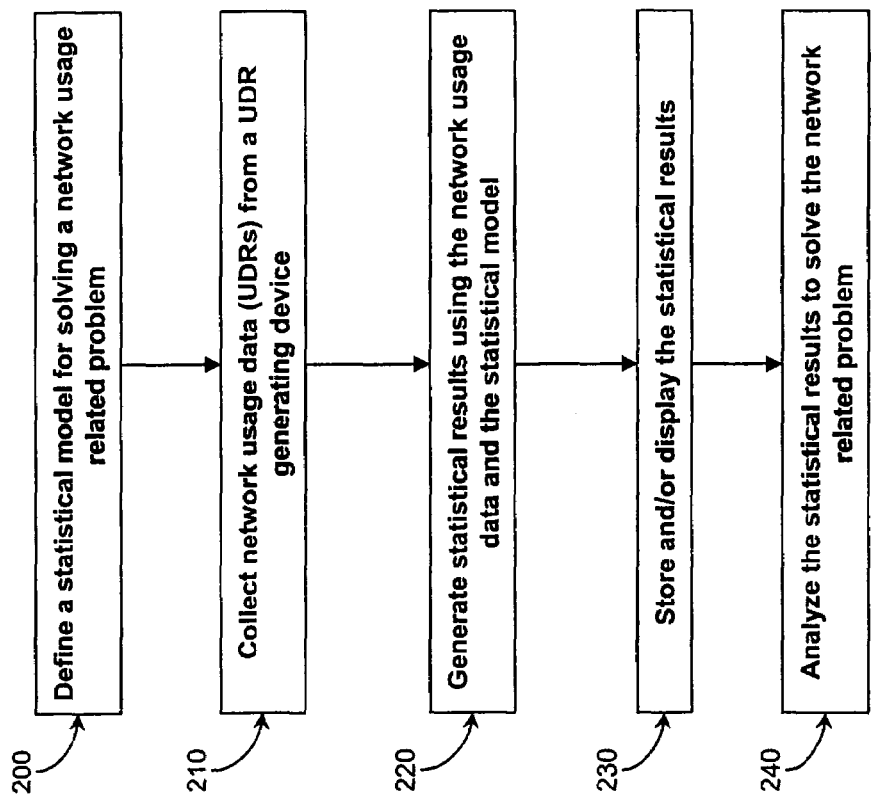
Figure 5: General method for solving network related problems.

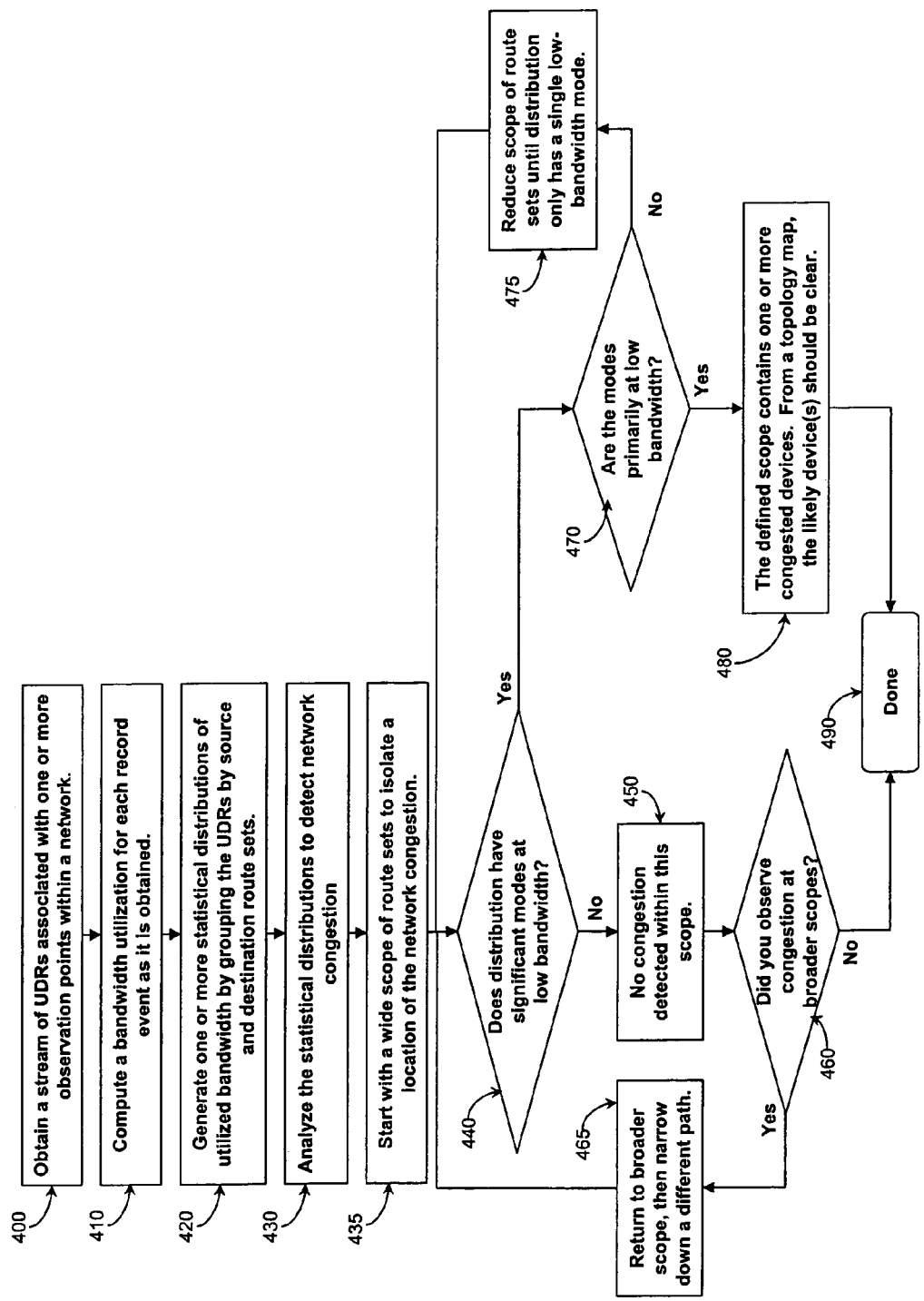
Figure 6: Iterative method for isolating likely devices causing congestion.

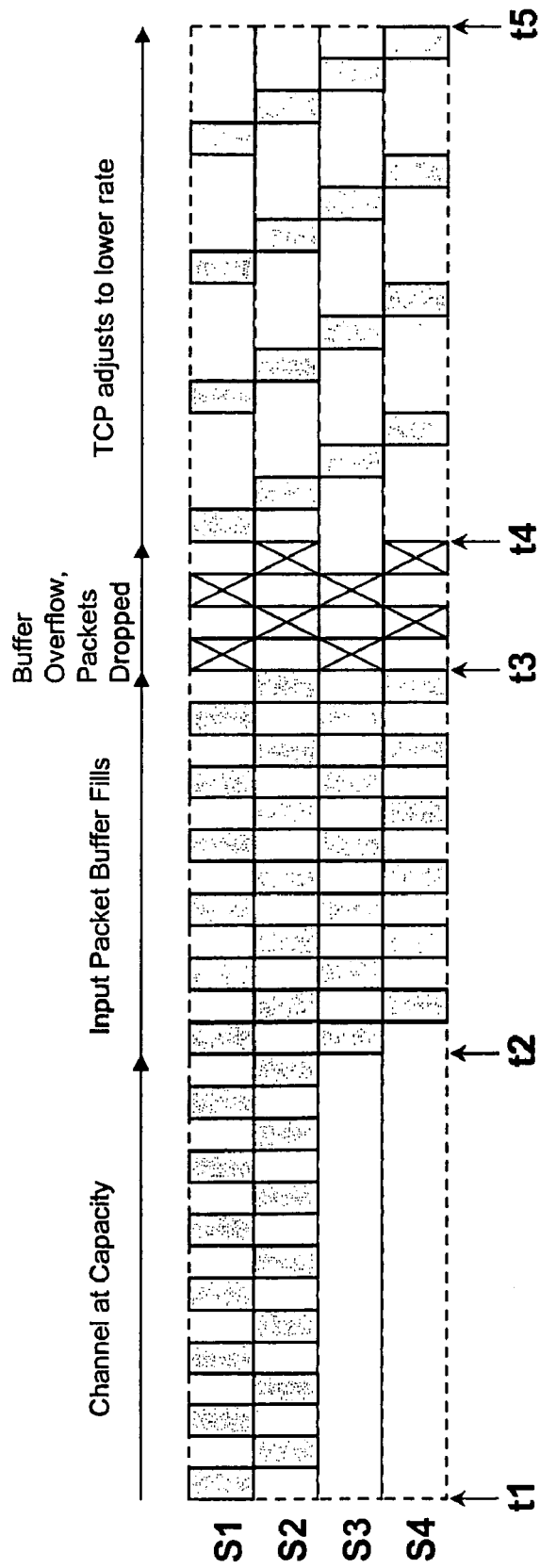
Figure 7: Exemplary changes in bandwidth with onset of congestion.

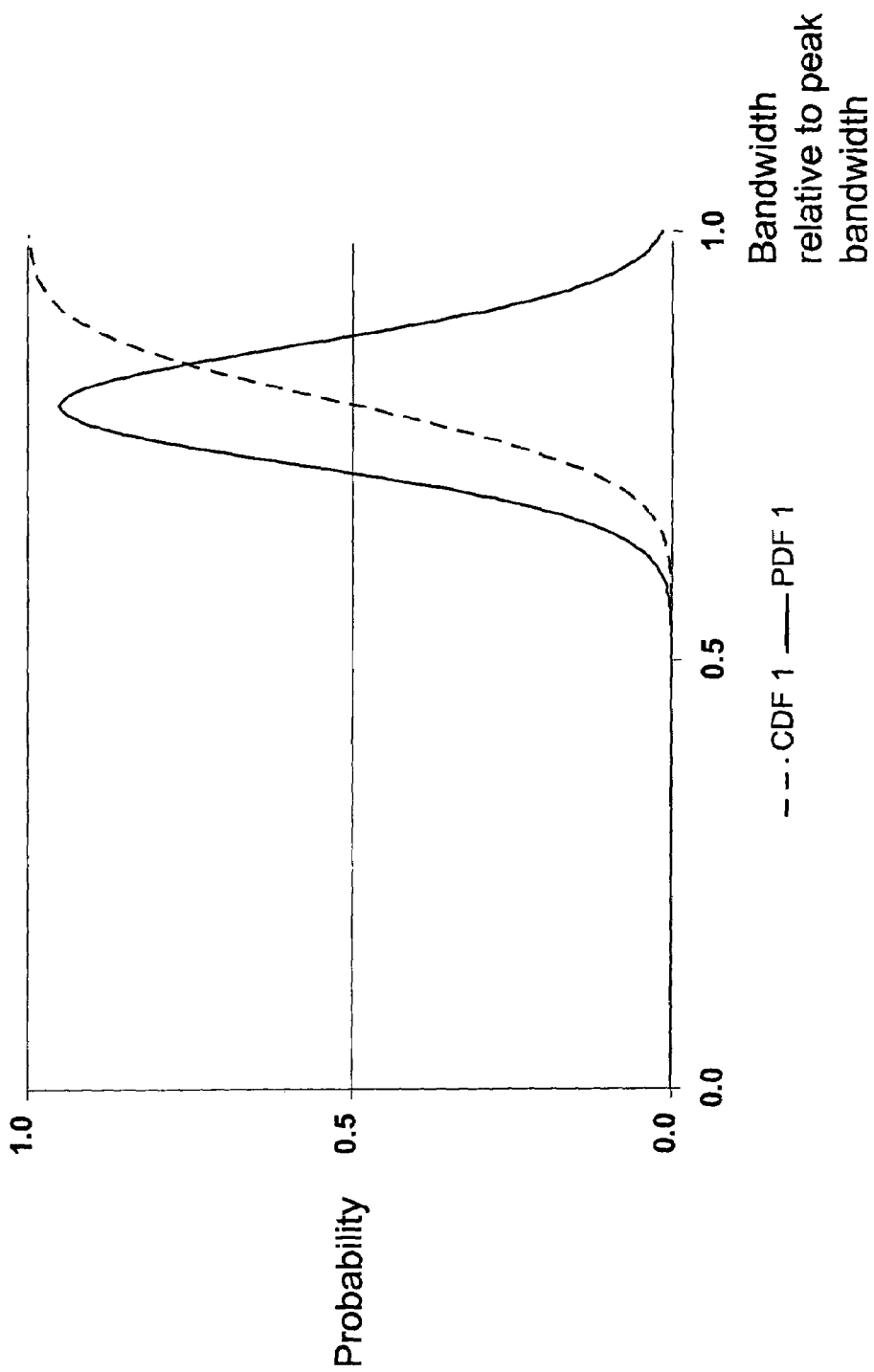
Figure 8: Analysis results of uncongested path, link or device.

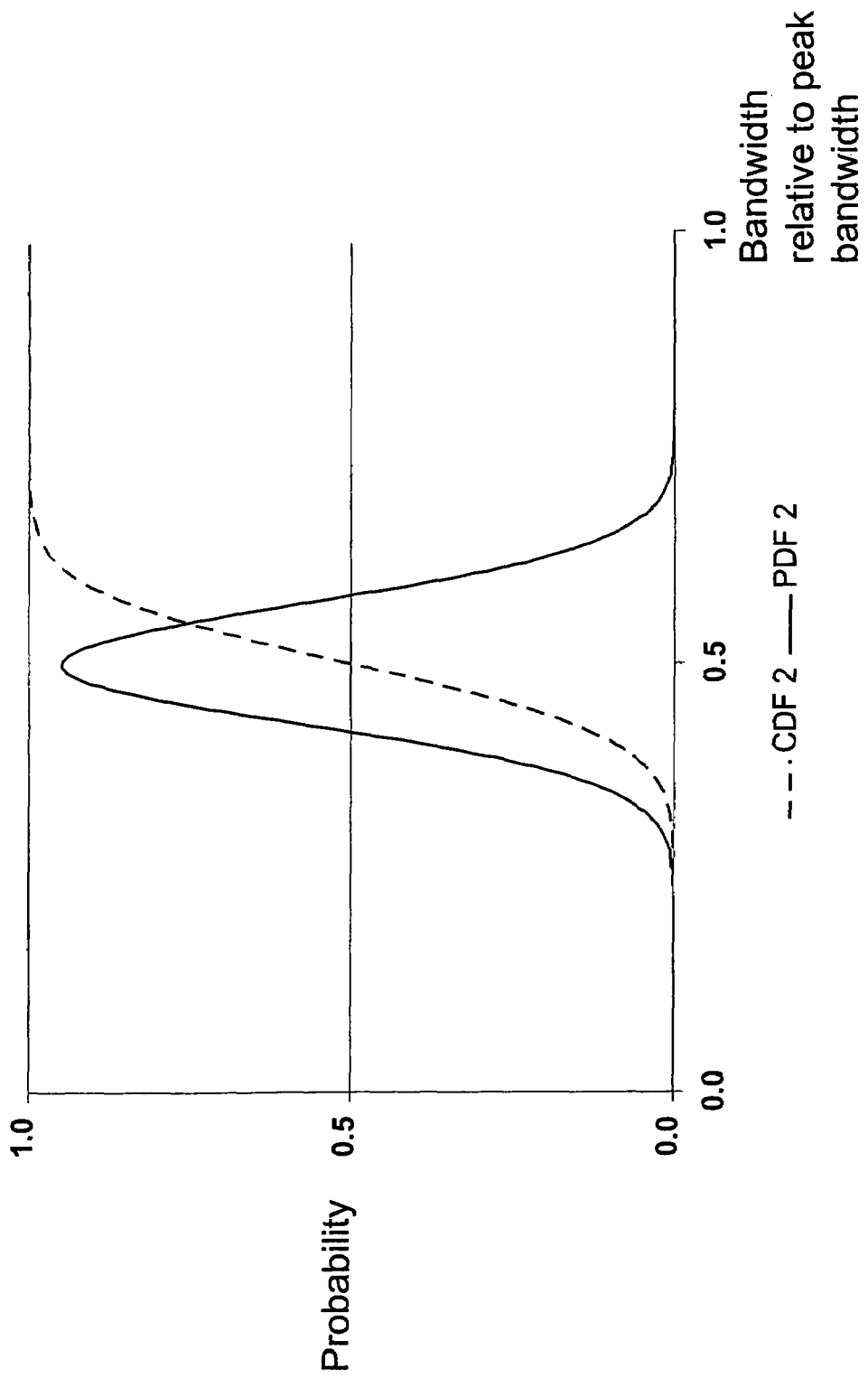
Figure 9: Analysis results of moderately congested path, link or device.

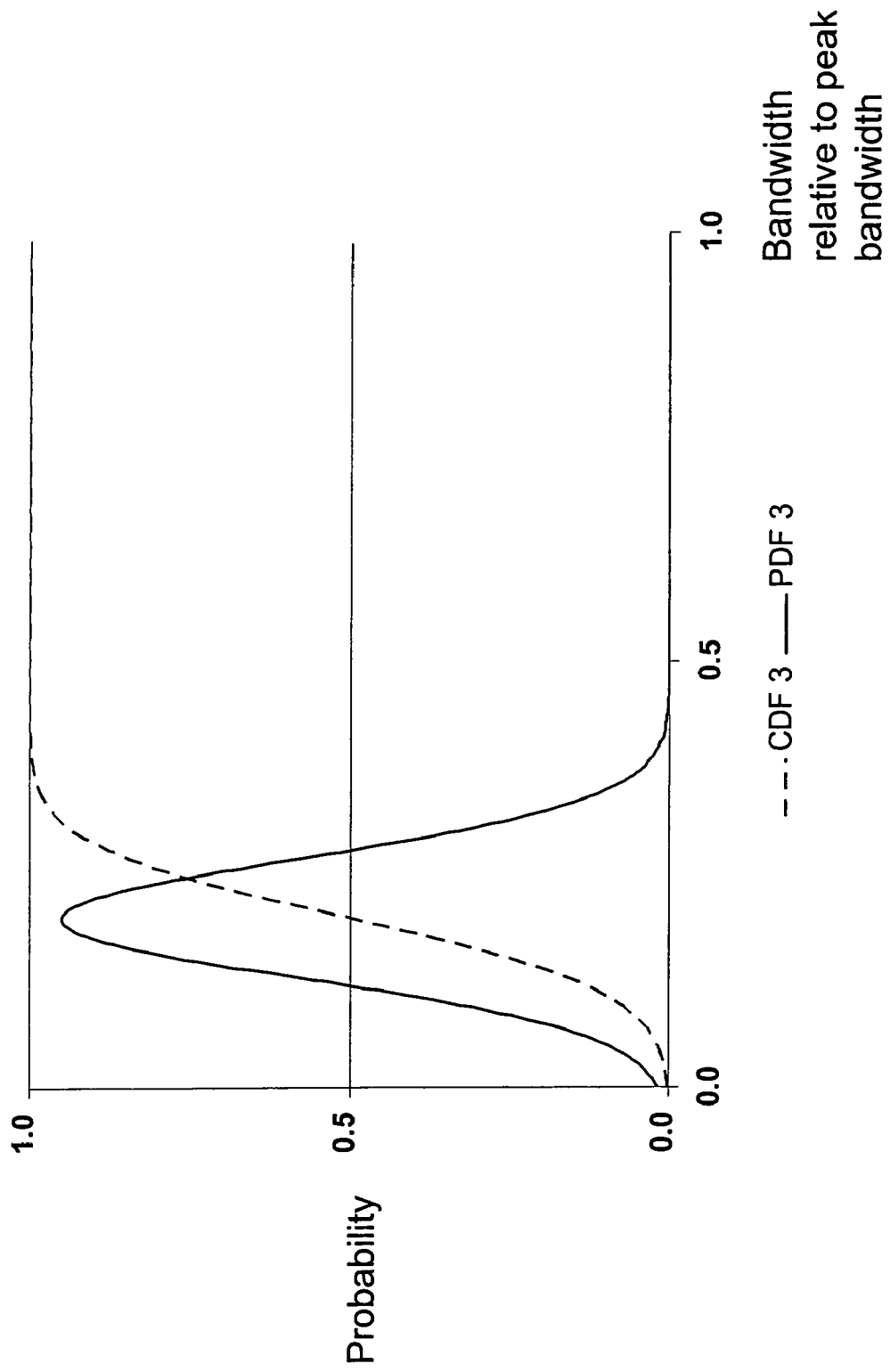
Figure 10: Analysis results of severely congested path, link or device.

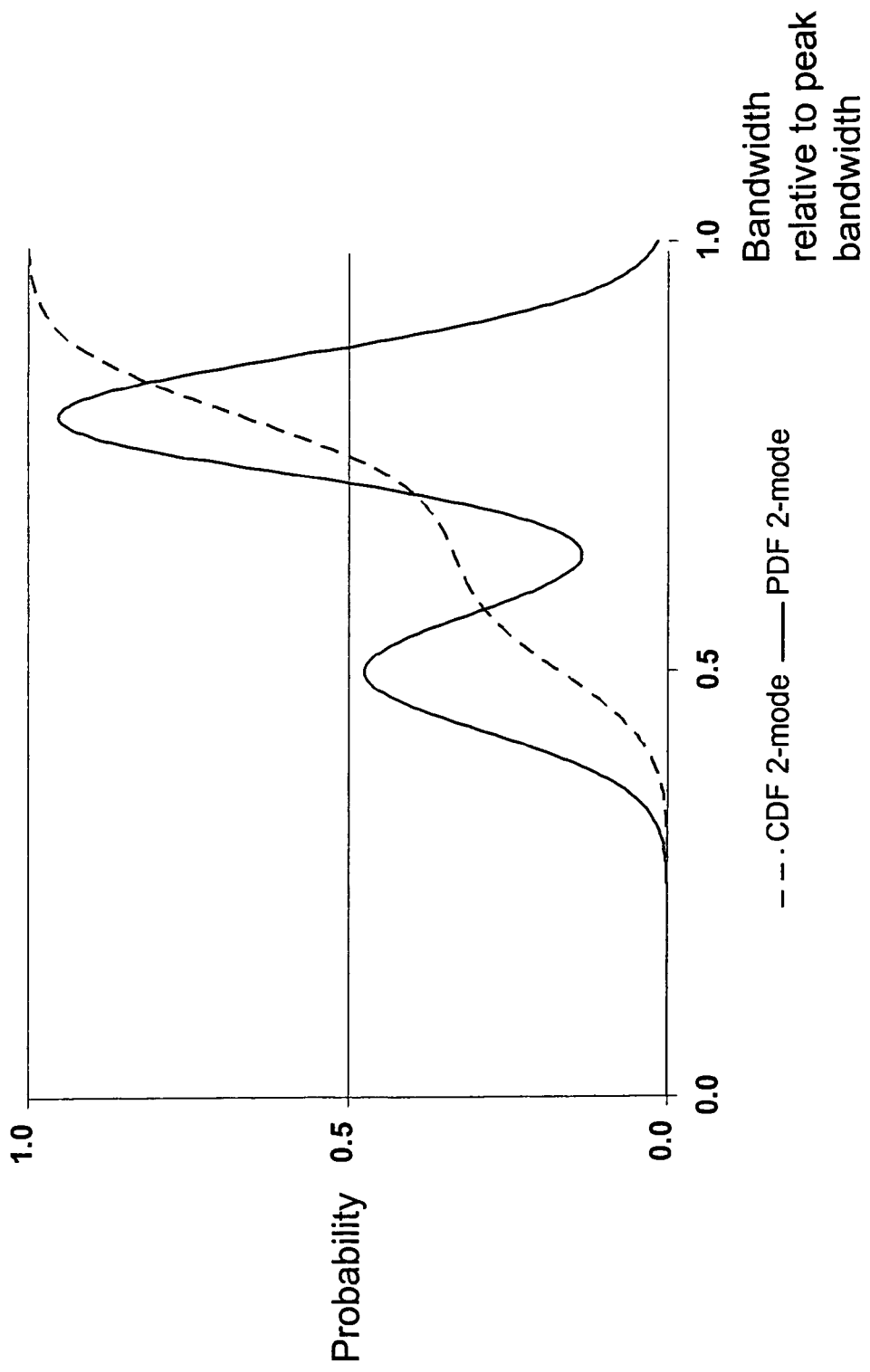
Figure 11: Bimodal distribution reveals remote congested path, link or device.

NETWORK USAGE ANALYSIS SYSTEM AND METHOD FOR DETECTING NETWORK CONGESTION

BACKGROUND

Network systems are utilized as communication links for everyday personal and business purposes. With the growth of network systems, particularly the Internet, and the advancement of computer hardware and software technology, network use ranges from simple communication exchanges such as electronic mail to more complex and data intensive communication sessions such as web browsing, electronic commerce, and numerous other electronic network services such as Internet voice, and Internet video-on-demand. Network usage is of particular interest to Network Service Providers (NSPs) that provide these capabilities by interlinking with each other and providing access services to their customers (herein also referred to as users or subscribers). This world wide interconnection of NSPs and the ability for individual users to access the Internet are based on the acceptance of the Internet Protocol (IP), which is now a world-wide standard.

Network usage data is useful for many important business functions, such as subscriber billing, marketing & customer care, product development, network operations management, network and systems capacity planning, and security.

Network usage data does not include the actual information exchanged in a communications session between parties, but rather includes numerous usage detail records (UDRs) containing one or more types of metadata (i.e., "data about data"). The types of metadata included within each UDR will vary based on the type of service and network involved, and in some cases, based on the particular network device providing the UDRS. In general, a UDR provides very detailed usage information about a particular event or communications connection between parties, such as the connection start time and stop time, source (or originator) of the data being transported, the destination or receiver of the data, and the amount of data transferred. A UDR summarizes usage information for very short periods of time (from milliseconds to seconds, occasionally minutes). Depending on the type of service and network involved, a UDR may also include information about the transfer protocol, the type of data transferred, the type of service (ToS) provided, etc. In telephony networks, the UDRs that make up the usage information are referred to as call detail records (CDRs). In Internet networks, UDRs do not yet have a standardized name, but will be referred to herein as UDRs. As used herein, the term "UDR" is defined as a small unit of measure of unidirectional network usage by a stream of IP packets that share common source and destination parameters during a time interval.

Network usage analysis systems process these UDRs and generate reports or summarized data files that support the above business functions. Network usage analysis systems provide information about how a Service Provider's services are being used and by whom. Network usage analysis systems can also be used to identify (or predict) customer satisfaction-related issues, such as those caused by network congestion and network security abuse. In one example, network utilization and performance (as a function of subscriber usage behavior) may be monitored to track the "user experience," to forecast future network capacity, or to identify usage behavior indicative of network abuse, fraud and theft.

However, a need exists for a simple and reliable mechanism for detecting and predicting network congestion, among other advantages.

BRIEF SUMMARY

The present disclosure is directed to a system and method for detecting congested locations within a network. The method includes receiving a stream of UDRs from one or more observation points within a network. The method further comprises computing an amount of bandwidth utilized by each UDR as each UDR is received from the observation point, generating a statistical distribution of the UDRs based on the amount of bandwidth utilized by each UDR, and analyzing the statistical to detect a congested location associated with the observation point.

BRIEF DESCRIPTION OF THE DRAWINGS

For a detailed description of exemplary embodiments of the invention, reference will now be made to the accompanying drawings in which:

FIG. 1 is a block diagram illustrating an exemplary network usage analysis system in accordance with various embodiments of the invention;

FIG. 2 is a block diagram illustrating a detailed view of the congestion logic within the exemplary network usage analysis system of FIG. 1;

FIG. 3 illustrates the relevant fields that may be extracted from the headers of the IETF standards Internet Protocol and Transmission Control Protocol by UDR generating devices;

FIG. 4 illustrates the relevant fields of a UDR that may be exported by a UDR generating device;

FIG. 5 is a flow-chart diagram illustrating a method for solving a network usage related problem in accordance with various embodiments of the invention;

FIG. 6 is a simplified view of how the average bandwidth of a channel may change from uncongested conditions to congested conditions;

FIG. 7 is a flow-chart diagram illustrating an exemplary method for isolating a remote device causing congestion, according to various embodiments of the invention;

FIG. 8 is a simplified illustration of how the bandwidth distribution of an uncongested link or device might appear;

FIG. 9 is a simplified illustration of how the bandwidth distribution of a moderately congested link or device might appear;

FIG. 10 is a simplified illustration of how the bandwidth distribution of a severely congested link or device might appear; and FIG. 11 is a simplified illustration of how the bandwidth distribution of a link supporting multiple paths where some of the paths are congested and some are not might appear.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Although the term "network" is specifically used throughout this disclosure, the term network is defined to include the Internet and other network systems, including public and private networks that use the IP protocol suite for data transport. Examples include the Internet, Intranets, extranets, telephony networks ("using voice over IP"), and other wire-line and wireless networks that are converging on the use of the IP family of protocols. Although the term "Internet" is specifically used throughout this application, the term Internet is merely one example of an IP "network."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

One of the major causes of poor quality of service (QoS) on the Internet is the phenomenon of congestion at a network device. Congestion occurs when the offered load of traffic to a device exceeds the throughput capabilities of the device and the device starts dropping packets. Throughput in this context is a measure of the ability of the device to receive and forward traffic on a sustained basis and is commonly measured in packets per second or bytes per second. This throughput is a function of the peak bandwidth (BW) capabilities of the device and the size of the input buffers to the device. When congestion occurs at an IP network device, the device may start dropping packets, which may seriously impact both interactive responsiveness and throughput as explained below.

In packet-switched networks, such as the Internet, network traffic is made up of data that is transported between two points in a network as a stream of "packets." As shown in FIG. 3, each of the packets includes a subset of the data to be transferred between parties (labeled packet data 180), and a combined TCP/IP header 185, which is used for Internet routing and carries key information used by the Internet protocols. Some of these TCP/IP header fields (shown in bold) can also be used for generating the usage data summarized in UDRs. The key fields of the TCP/IP headers that are relevant to congestion analysis are the source and destination IP addresses, the source and destination ports, the total length (byte count), and the protocol. The source and destination port addresses serve as higher granularity definition of the source and destination fields of the IP packet header and as such are herein lumped into the concept of source and destination addresses. As each packet is received by a UDR generating device, it is matched and accumulated with previously received packets that share the same source and destination addresses, and optionally with the same source and destination port addresses for a short period of time (sub-seconds to seconds). This brief aggregation process is what creates a UDR 190 illustrated in FIG. 4. In addition to the header fields described above, the UDR generating device will add additional fields to the UDR such as the start-time and end-time of the packets accounted for in the UDR, as well as the number of packets aggregated.

The UDRs are then exported by the UDR generating device as a "stream" of UDRs. As used herein, a real-time stream of UDRs may be described as a stream of UDRs that are "flushed" or transferred from a temporary data storage location (usually Random Access Memory, RAM) within the UDR generating device at regular and frequent intervals. The rate of UDRs being generated will depend on device configurations set by the network provider, the traffic load presented to the UDR generating device, and dynamically on the amount of temporary storage space available within the UDR generating device. A moderate sized IP router can generate 20 to 30 thousand UDRs per second. A NSP with a moderate sized network of routers can have an aggregate number of UDRs to process about 300K UDRs per second.

In general, UDR generating devices may include substantially any network device capable of handling raw network traffic at "line speeds" and generating UDRs from that traffic. Exemplary network devices include routers, switches and gateways, and in some cases, may include application servers, systems, and network probes. Specific examples of UDR generating devices for Internet traffic include Cisco routers and switches. The form of UDR exported by Cisco devices is referred to as "NetFlow," a technology also provided by Cisco. Other examples of UDR generating devices for Internet traffic include Foundry Networks routers and switches. The form of UDR exported by Foundary Network devices is referred to as "sFlow," a technology provided by Inmon Corporation. In most cases, the small UDR records generated by UDR generating devices are exported as a stream of UDRs to network usage analysis systems.

One suitable network usage analysis system for use with the present embodiments is disclosed in U.S. patent application Ser. No. 09/548,124, filed Apr. 12, 2000, entitled "Internet Usage Analysis System and Method," having a common assignee and inventor as the present application, and is incorporated herein by reference.

As shown in FIG. 1, network usage analysis system 100 includes a data analysis system server 130 and a data storage system 140, in one embodiment. Data analysis system server 130 receives UDRs 190 (FIG. 4) from UDR generating device 120, which is a network device that is part of the NSP IP network 110. In one embodiment, network 110 includes the Internet 115.

Data analysis system server 130 receives the streaming network usage data (in the form of UDRs 190) from UDR generating device 120 via communication link 170. In one embodiment, UDR generating device 120 may be included within network 110. In another embodiment, UDR generating device 120 may be implemented at a location physically apart from, though functionally coupled to, network 110. Though shown in FIG. 1 as separate from data analysis system server 130, UDR generating device 120 may be a part of data analysis system server 130, in another embodiment.

Data analysis system server 130 uses the UDRs 190 to perform predetermined network usage statistical analysis. In general, a statistical model 135 may be defined for solving one or more network usage related problems, such as network congestion, network security abuse, fraud and theft, among others. In some cases, the statistical model 135 may be contained within congestion logic 150, as shown in FIG. 1. The data analysis system server 130 uses the UDRs 190 and the statistical models 135, with congestion logic 150 to generate a statistical result, which may be subsequently stored within data storage system 140. Exemplary embodiments for storing the statistical result will be described in more detail below.

In one aspect, the data analysis system server 130 is responsive to a user interface 160 for interactive analysis of the UDRs 190 using statistical model 135 and congestion logic 150. User interface 160 may comprise substantially any input/output device known in the art, such as a keyboard, a mouse, a touch pad, a display screen, etc. In one example, a graphical display of the statistical results may be output to a display screen at user interface 160.

In one embodiment, data analysis system server 130 comprises a computer software program, which is executable on one or more computers or servers for analyzing the network usage data in accordance with various embodiments of the invention. The computer software program, including statistical model 135 and congestion logic 150, may also be stored in data storage system 140. Though data storage system 140 is shown as external to the data analysis system server 130, data storage system 140 could be alternatively arranged within the data analysis system server 130. Data storage system 140 may comprise substantially any volatile memory (e.g., RAM) and/or non-volatile memory (e.g., a hard disk drive or other persistent storage device) known in the art.

As noted above, data analysis system server 130 may use the statistical model 135 for solving a variety of network usage related problems. A general method for analyzing high momentum network usage data in accordance with the present will now be described in reference to the method of FIG. 5 and the network usage analysis system (100) of FIG. 1. Exemplary methods for solving a particular network usage related problem will be described in more detail below.

In a general embodiment, a method for analyzing high momentum network usage data may begin by defining a statistical model for solving a network usage related problem (step 200). Examples of suitable statistical models may include linear distributions, log distributions, the top N occurrences, and a time series of occurrences, among others. The type of statistical model chosen is generally based on the network usage related problem to be solved. Exemplary statistical models for solving a particular network usage related problem will be described in more detail below.

After selecting the appropriate type of statistical model, the statistical model may be further defined by determining the appropriate model properties (e.g., bin-width, bin-resolution, thresholds, etc.), time interval type (e.g., fixed or rolling time intervals), and time interval over which to collect the network usage data (e.g., seconds to days). In some cases, the method may select one or more types of network usage data (i.e., UDRs 190) to be collected for use by the statistical model. In other words, one or more "fields" or "categories" of network usage data may be chosen for collection and analysis purposes. As shown in FIG. 4, these fields contain metadata (i.e., data about data), such as a source address/port #, a destination address/port #, an amount (or volume) of data transferred (e.g., a packet or byte count), a start time and end time, the protocol used to transfer the data (e.g., TCP or UDP), etc. As an advantage, the volume of network usage data collected with the present method can be greatly reduced by selecting only the network usage data types (or record event fields) required by the chosen statistical model.

In step 210, the UDRs are collected from a UDR generating device 120 by data analysis system server 130. In one embodiment, the network usage data consists of a real-time stream of UDRs generated by a UDR generating device 120. The metadata collected from the record event stream may include, for example, a source and/or destination identifier (e.g., an IP address or port #), a usage metric (e.g., bandwidth, volume, time), a start date/time and an end date/time, among others.

In step 220, statistical model 135 is applied to the metadata from the UDRs for generating statistical results, which are representative of the collected network usage data. In other words, statistical results are generated using the metadata and the chosen statistical model. Unlike conventional analysis methods, however, the step of generating statistical results can be accomplished in "real-time," i.e., immediately or soon after data analysis system server 130 receives the metadata from UDR generating device 120. The present method accomplishes real-time analysis by analyzing the data as it is received, as opposed to storing vast amounts of network usage data in a database system for analysis of the pertinent portions of the stored network usage data at a later time. In addition to real-time analysis, the present method is adapted to generate statistical results using metadata collected from all received UDRs, as opposed to conventional analysis methods, which must sample, compress and/or aggregate the record event stream to comply with data storage requirements. For at least this reason, the present method provides results that are significantly more accurate than those obtained using conventional analysis methods.

In step 230, the statistical results may be stored in a storage device and/or displayed on a display screen. The statistical results may be stored in volatile memory (e.g., in RAM within data analysis server system 130), stored in non-volatile memory (e.g., a hard disk drive or other persistent storage within data storage system 140), or both. In one example, the statistical results may be temporarily stored in volatile memory and also archived in non-volatile memory. Regardless of storage type, the overall data storage requirements are greatly reduced by storing the statistical results, which represent the collected network usage data, in lieu of storing all of the raw network usage data.

For illustrative purposes, assume data collection system 130 receives an input stream of UDRs at an approximate rate of 300,000 UDRs per second. Assuming each UDR is an average of 50 bytes "on the wire," UDR generating device 120 may send the UDR stream to the data analysis system server 130 at a rate of about 120 megabits per second. When stored into a database, however, the very compact binary form of the UDR must be translated into fields of a data base, which is a less efficient storage format. Assuming a storage expansion factor of about 3, the data storage requirements would be nearly 4 TB/day (Terabytes per day). However, the overall data storage requirements can be reduced dramatically by storing the statistical results (each of which may consume only a few kilobytes) instead of storing the input data stream. If one were to store 10,000 distributions (representing 10,000 observation points in a network), for example, such storage may consume a mere 20 MB (Megabytes) of storage space.

The statistical results may also be stored in various forms, such as an array or tree structure. In one example, raw network usage data may be collected and organized as statistical results in the form of a linear or logarithmic histogram (i.e., a distribution). As relevant network usage data is collected from the incoming data stream, the corresponding statistical results are stored in a number of value based bins. In some cases, the bins are created in real-time and on an "as-needed-basis" (or "on-the-fly") based on the values of the incoming data stream. The resultant histogram (referred to herein as a "dynamic distribution") can then be stored in memory (as an array or tree structure), and used for subsequent network usage analysis.

In one embodiment, the method for dynamically creating and storing distributions in various forms may be similar to the method disclosed in U.S. patent application Ser. No. 09/919,149, filed Jul. 31, 2001, entitled "Network Usage Analysis System Having Dynamic Statistical Data Distribution System and Method" and incorporated herein by reference. Other methods for creating and storing statistical results in accordance with various embodiments of the invention will become apparent to those skilled in the art after reading the present application.

Whether created dynamically or not, the resultant distribution may also be updated in real-time using a rolling time interval, as described in U.S. patent application Ser. No. 09/919,527, filed Jul. 31, 2001, entitled "Network Usage Analysis System and Method For Updating Statistical Models" and incorporated herein by reference.

In step 240, the statistical results can be analyzed for solving a network usage related problem. Such analysis may be performed "automatically" by additional computer program instructions, or performed "manually" by a user of the network usage analysis system. In one example, the statistical results are graphically (or otherwise) displayed on a display screen at user interface 160. As such, the user (and/or the computer program instructions) may use the displayed results for monitoring and/or detecting various network usage "characteristics" or "behaviors." The displayed results may also be used for performing interactive analysis of the network usage data via user interface 160. In one embodiment, the statistical model may include one or more variable elements (such as a threshold value), wherein the variable elements are changeable via user interface 160 to interactively model network usage. Results of the analysis may also be stored within data storage system 140 and/or displayed on the display screen of user interface 160, as desired.

Internet Service Providers (ISPs) have a particular need for closely monitoring and managing the Quality of Service (QoS) received by their customers. Through such close monitoring, an ISP may be able to detect the occurrence of congestion within its network, but is often unable to isolate a source of the congestion in a simple and reliable method. Traditional methods for detecting network congestion will be described in more detail below.

The Internet Protocol (IP) is the protocol standard most widely used for data transmission to and from the Internet. In general, the IP standard provides a basic end-to-end transport mechanism for data but does not guarantee delivery. Built on the foundation of IP is a suite of other protocols that offer additional services; the most widely used of these are the User Datagram Protocol (UDP) and the Transmission Control Protocol (TCP). UDP, which is used for streaming media (e.g., voice, or music) among many other things, does not provide any guarantee of delivery. Under conditions of congestion, UDP packets are dropped by the congested device and there is no attempt to resend them. TCP, however, provides a guarantee of delivery of data to the destination, and because of this guarantee, it is the dominant protocol used on the Internet.

In operation, TCP receiving devices send an acknowledgement (ACK) packet back to the TCP transmitting device. This ACK packet contains the sequence number of the last received octet +1. From this information, and knowing what sequence numbers have been sent but not yet acknowledged, the TCP transmitting device can detect if any of its previously transmitted packets have been dropped along the way. Once dropped packets have been detected, the TCP protocol is designed with a backoff algorithm that automatically reduces the number of packets per second it transmits into the network by one-half, thus dramatically reducing the effective throughput rate. The TCP transmitting device will continue to reduce the throughput by factors of one-half until dropped packets are no longer detected. Thus, the TCP response to congestion is an exponential reduction in the effective throughput. In order to adhere to its contract of guaranteed delivery, the TCP transmitting device will retransmit the packets it has detected as missing, although at a slower rate. If a network device is congested, all TCP flows through that device will experience dropped packets and respond in the same way. The collective action of the TCP protocol across many simultaneous flows through a congested device is to equally share the available bandwidth of the channel amongst all TCP flows. The overloaded device (or link) responsible for the congestion will be referred to herein as the "congestion point" or the "congestion location."

An example of this phenomenon is illustrated in FIG. 6. The horizontal axis represents time with specific times shown as t1 through t5. The gray rectangles are symbolic of TCP/IP packets traveling through a given path that is defined with a maximum throughput capacity of 1.0. Each row represents sources of packets that are initially transmitting packets at a rate of 0.5. From time t1 to t2, only S1 and S2 are transmitting and the channel is full but not congested. At time t2, two additional sources begin transmitting each at a rate of 0.5. Devices along the path have input packet buffers that begin to fill up starting at time t2. Because the path cannot handle all of this traffic, the buffers overflow at time t3 and start dropping all new incoming traffic. At time t4 the sending TCP sources sense the dropped traffic and reduce their sending rate by one half. At this slower rate (which is equal for all sources), the path can once again handle all the traffic, albeit at a significantly lower bandwidth than when the channel was substantially uncongested (i.e., between t1 and t2). For example, if one were to obtain a bandwidth distribution per source for the periods t1 to t2 and t4 to t5, they would notice that the median bandwidth of the period t4 to t5 distribution is roughly one half of the median bandwidth of the period t1 to t2 distribution.

The determination of network congestion at the TCP protocol level is currently based on the detection of dropped packets by the sender, and the response of TCP to congestion is an exponential reduction in throughput. A proposal for Explicit Congestion Notification (ECP) is currently in the standards track of the Internet Engineering Task Force (IETF) to enhance the detection mechanism for congestion. This proposal will enable the receiving devices to provide early warning signals of congestion to the transmitting devices, which in turn, would enable the transmitting devices to apply the exponential back-off algorithm before packets must be dropped by the receiving device. Preventing unnecessary packet drops will ultimately improve throughput and congestion, because these packets will not have to be resent (which would only add to the congestion problem). However, though ECP will improve the experience of congestion to some degree, it will not be able to eliminate congestion. As such, transmitting devices will continue to respond to congestion in the same manner (e.g., an exponential back-off algorithm will still be used), regardless of whether the transmitting device infers congestion through detection of dropped packets or by receiving advance notification via ECP.

An increase in latency (the time required for a packet to travel from the transmitter to the receiver) is another indicator of congestion that is often used. It is important to note, however, that while large increases in latency over extended periods are likely indicators of congestion, short-term increases in latency are not. This is because latency and congestion are actually different phenomena. Increased latency is primarily a result of the existence of input packet buffers in the network devices, and increased time to resend traffic if it has been dropped.

A packet buffer is a first-in, first-out queue that smoothes out short bursts of load and avoids unnecessary dropping of packets. Due to the bursty nature of Internet traffic, the contents of packet buffers constantly shrink and grow. When a packet buffer starts filling up due to short bursts of traffic, any new packets coming into the nearly full buffer will experience increased latency due to the waiting time in the buffer. The larger the buffers, the longer the potential latency can grow. From a TCP protocol point-of-view, as long as the network devices in the path can keep up with the sustained transmission rate, no packets will be dropped; thus, no back-off response and no congestion. Although latency is often used as an indicator of congestion, latency tends to have a wide variance from measurement to measurement as the buffers in a particular path shrink and grow with instantaneous bursts of traffic on the network. When congestion does occur, it has a dramatic impact on latency because the packets that get dropped must be retransmitted. The increased load of retransmitted packets causes the buffers to be filled even more, thereby making latency worse.

The determination of network congestion at the network level is usually detected by measuring the latency on one or more paths through a network. Though methods for detecting current occurrences of network congestion exist in the art, they fail to provide a simple and reliable means for isolating a source of the congestion (i.e., a "congestion location") and generally suffer from additional drawbacks.

Therefore, an improved system and method for detecting and isolating occurrences of network congestion is provided in FIGS. 1, 2 and 7. Exemplary results that may be obtained by utilizing the improved system and method are provided in FIGS. 8-11. The embodiments shown in FIGS. 1, 2 and 7-11 provide an improved means for detecting and isolating network congestion, which may result in a significant cost savings (for the ISP) and increased customer satisfaction.

FIG. 1 contains a simplified illustration of an Internet network and its relationship to an ISP IP network in accordance with one embodiment of the invention. As shown in FIG. 1, a network may be described as including one or more UDR generating devices 120 and a number of branching paths (or routes) through one or more layers of internal routers and network devices (represented as R1 through R8), some of which are ultimately connected to border routers (represented as R5 through R8). These border routers can then be further coupled to multiple layers of routers of an external network, such as the Internet (represented by the circles in the Internet cloud 115), and referenced by their external route set (ERS).

The type of network shown in FIG. 1 forms a hierarchical network only in the sense that at any point in time there is generally a preferred path from a customer/subscriber device (represented as R1 and R2) and some ultimate remote destination out on the Internet. It is recognized that real networks offer redundant and bridging paths that form many possible paths through a network in case of failures or other issues. This fact does not diminish the value of this invention. The simpler hierarchical network is shown to illustrate a method which can also be applied to the more complex network meshes.

Each circle in FIG. 1 represents a router or device configured for consolidating the traffic routes that it controls. Routers, switches and gateways (hereafter referred to as routers) are examples of network devices that receive traffic from multiple sources and then forward the traffic on to the next device (called the next-hop) on its way to the ultimate destination. All of these devices have responsibility for forwarding traffic to a specific set of routes.

The task of routing on the Internet is accomplished through protocols that exchange "route" information between routers. Anyone skilled in the art will recognize protocols such as BGB4, OSPF, IS-IS, RIP, etc, which are international standards for this set of tasks.

A route contains a minimum of 3 pieces of information: a prefix address, a prefix length, and a next-hop address. A prefix is a special form of an IP address, whereby only the most significant p bits (the prefix length) are considered significant, where p can vary from 8 to 32 (for IPv4). The lower 32-p bits are set to zero.

An IP (version 4) address is commonly written as 4 groups of decimal numbers with dots in between, where each decimal number can very between 0 and 255. An example of a 32-bit address might be written 127.21.53.5. An example of a 24 bit prefix that contains this address would be written 127.21.53.0/24. This prefix, which leaves only the last 8 bits as zeros, defines a range of 256 32-bit IP address starting with 127.21.53.0 and ending with 127.21.53.255.

The next-hop address is used routers to forward a received packet on towards its ultimate destination.

Each router is configured to forward any traffic that it receives to a specific set of routes called a route set. From the perspective of the NSP shown in FIG. 1, the routers represented by circles in Internet cloud 115 are external to its network and each are configured to manage a specific external route set or ERS. For example, the router labeled with ERS 1 would be responsible for forwarding traffic received from NSP router R5 to either ERS 1.1 or ERS 1.2. The devices are numbered in the manner shown to indicate that the route sets of ERS 1.1 and ERS 1.2 are subsets of the ERS 1. A similar situation exists for the internal routers R1 through R8 of the NSP, which have internal route sets and are also labeled with an IRS n.

Each network device represented by the circles in FIG. 1 and the links connecting them is capable of handling an upper traffic volume limit of a specific metric per unit of time (usually bits per seconds). Typical metrics of volume include a number of bits, bytes, packets, messages, queries, etc. In other words, each network device and link demonstrates a certain "capacity." During normal operation, a network device may utilize only a fraction of the total capacity available for handling network traffic. Typical IP network engineering design practices try to keep the average utilization below 80%. However, Internet traffic can have large swings in volume and network congestion will occur if the volume of traffic presented to a network device (referred to as "offered load") exceeds the capacity of the network device for long enough periods. Under these conditions, the input buffers of a receiving network device (e.g., router) will overflow forcing the device to drop packets.

FIG. 7 provides an improved method for detecting and isolating network congestion by analyzing the statistical distributions of UDR bandwidth utilization. In general, a preferred method for detecting and isolating network congestion is illustrated in FIG. 7 as an expansion upon the methodology of FIG. 5. As such, method steps described above in reference to FIG. 5—but not shown in FIG. 7—may still be applicable to the method of FIG. 7, in some embodiments of the invention. For example, the step of defining a statistical model (step 200 of FIG. 5) may be performed prior to the method steps shown in FIG. 7. However, it may be desirable to define the statistical model (and/or the model parameters) in subsequent steps of the method of FIG. 7.

As shown in FIG. 7, the present method may obtain a stream of record events (UDRs) associated with one or more observation points in the network (step 400). As used herein, an "observation point" is broadly defined as a strategically located metering point in the network. In some cases, an observation point may include a network device, such as a network device arranged on a boundary of the network (e.g., border routers R5 through R8 of FIG. 1) or a network device arranged within the network (e.g., internal routers R3 and R4 of FIG. 1). The choice of observation point is a function of many factors including cost, the data rate to be observed, and physical location.

In some cases, the stream of UDRs may be "pushed" from the UDR generating device at regular and frequent time intervals. As such, UDR generating device 120 may be configured for transmitting the stream of record events. In other cases, however, the UDR generating device 120 may be polled by the data analysis system server 130 in order to retrieve the stream of UDRs from the UDR generating device. In one embodiment, the data analysis system server 130 may obtain only the portions of the UDRs available that are relevant to a particular network problem. For example, the data analysis system server 130 may obtain only the packet volume, the start time and the end time from each of the UDRs in the stream. In another example, the data analysis system server 130 may obtain only the relevant portions of certain UDRs, such as those UDRs transmitted (1) according to a particular packet protocol, (2) in a particular traffic direction, and/or (3) along specific route(s) passing through a particular network device. In an alternative embodiment, the entire UDR (and possibly portions of the packet data) may be obtained for further analysis.

In a specific embodiment, the stream of UDRs is obtained from one or more network devices arranged on the boundary of the network (e.g., border routers R5 through R8 of FIG. 1). In such an embodiment, the present method may avoid collecting duplicate record event streams by "metering at the edges" of the network (i.e., collecting record event streams where traffic originates or terminates), and thereby reducing the volume of data collected. However, metering at the edges does not limit the location of observation points to the network boundary, but instead enables record event streams to be obtained from any number of observation points (e.g., from one to thousands of points) located substantially anywhere within the network. As a particular aspect of the present method, multiple record event streams may be obtained from any number of observation points at substantially the same time (i.e., simultaneously), and at substantially any time of day (i.e., regardless of network usage), without adversely affecting network performance.

In step 410, the amount of bandwidth utilized by each UDR may be computed as soon as each UDR is obtained (i.e., in real-time) from network devices associated with the one or more observation points. In one embodiment, data analysis system server 130 may compute the amount of bandwidth utilized by each record event by dividing the packet volume by the difference between the packet end and start times [i.e., (packet volume)/(end time−start time)]. Alternatively, UDR generating device 120 may compute the bandwidth utilization of each record event as it is obtained.

In step 420, a statistical model 135 may be used to generate one or more statistical distributions of the record events based on the amount of bandwidth utilized by each record event received during a small interval of time (e.g., 5 minutes). In other words, one or more statistical distributions may be generated by grouping the record events by observation point and by computed bandwidth utilization. Each statistical distribution may, therefore, characterize the UDR bandwidth utilization of a particular observation point during a particular point in time. The statistical distributions are generated in real-time by applying statistical model 135 to each record event as soon as its bandwidth utilization is computed. Examples of suitable statistical models may include histograms (linear or log), the top N occurrences, and a time series of occurrences, among others.

As noted above, the statistical model may be chosen and its relevant parameters defined before the stream of record events are obtained by data collection system 120 (as described in steps 200 and 210 of FIG. 5). In other cases, however, a user may wish to make certain changes to the statistical model (e.g., altering one or more parameters of the statistical model, or selecting a different statistical model altogether) at some point in time after the initial record events are received. Therefore, statistical model 135 preferably demonstrates an adaptive configuration, such as disclosed in U.S. patent Application No. 60/559,808 filed Apr. 5, 2004, entitled "A System, Carrier Medium and Method for Monitoring Network Activity" and incorporated herein by reference.

In one embodiment, a histogram may be chosen to characterize the number of record events per range, or "bin," of bandwidth utilization. If the lower bound and upper bound of bandwidth utilization is known, a linear histogram may be used to keep track of the stream of record events in one or more bins, each including a different range of bandwidth utilization. However, linear histograms use equally spaced intervals (i.e., equal "bin widths"), which may create difficulties for characterizing certain types of data, such as streaming Internet data. Thus, a dynamically created histogram may be chosen to characterize the stream of record events, in other cases. As used here, a histogram is "dynamically created" if additional bins are created "on-the-fly" based on the bandwidth utilization of a recently collected record event. Whether created dynamically or not, the resultant histogram may be updated in real-time to reflect the recently collected record event.

In some cases, the one or more statistical distributions may be stored prior to performing any further analysis (as described in step 230 of FIG. 5). As described above, the statistical distributions may be stored in various forms (e.g., an array or tree structure), and may be stored in volatile or non-volatile memory. Regardless of storage type, the overall data storage requirements of the present embodiments are trivial (e.g., several orders of magnitude less) compared to the vast amounts of storage space typically required by conventional database analysis systems. In other cases, it may not be necessary to store the statistical distributions prior to analysis thereof.

In step 430, the one or more statistical distributions may be analyzed for detecting a congested location within the network. As noted above, the analysis may be performed "automatically" by additional computer program instructions, or performed "manually" by a user of the network usage analysis system. In some cases, the statistical distributions and the analysis results are displayed (graphically or otherwise) for monitoring network congestion. Alternatively, only the analysis results may be displayed for monitoring network congestion.

In some cases, analysis results of a particular statistical distribution may indicate normal, uncongested traffic flow conditions through a corresponding observation point, as shown in FIG. 8. The smooth and dotted lines of FIG. 8 can be used to illustrate exemplary analysis results obtained by applying a probability density function (PDF) and a cumulative probability function (CDF), respectively, to the raw data collected by the statistical model. However, one skilled in the art would understand that other statistical functions could alternatively be used for analyzing the data received from the observation point.

More specifically, FIG. 8 illustrates a fictitious statistical bandwidth distribution of traffic flow on a composite path through the network that is not experiencing congestion. As such, the smooth solid line of FIG. 8 may represent the PDF of the number of measured UDRs having a particular bandwidth value relative to a peak bandwidth value. In FIG. 8, a bandwidth value of 1.0 on the X-axis represents a normalized theoretical peak bandwidth in the channel or path being measured. The absolute scale of the PDF is not important and is not shown. The Y-axis represents the probability that a UDR will have a bandwidth value less than or equal to a chosen value (i.e., a threshold value) of X bandwidth. This probability is read from the dotted line, or the cumulative probability function (CDF) derived from the PDF.

In other cases, the analysis results may indicate varying degrees of congested traffic flow conditions through the observation point, as shown in FIGS. 9-11. FIG. 9 illustrates how the PDF and CDF might appear on a moderately congested path in the network. FIG. 10 illustrates how the PDF and CDF might appear on a heavily congested path in the network. FIG. 11 illustrates how the PDF and CDF might appear when the selected path through the network contains both uncongested flows and moderately congested flows.

As shown in FIGS. 8-11, a median value of the PDF and CDF distributions occurs at an X-axis value (i.e., a normalized bandwidth value) when the dashed line crosses the Y-axis value of 0.5 (i.e., a 50% probability). Other probability threshold points could also be chosen (e.g., 0.95 or a 95% probability) to represent a modal value of the PDF and CDF distributions. The choice of threshold values for statistics like the mode, median, mean, quantile, or percentile be selected "automatically" by additional computer program instructions, or "manually" by a user of the network usage analysis system, and may be subsequently changed or updated, as desired.

As shown in FIGS. 8-11, number of UDRs occurring at the median value may change dramatically with varying amounts of congestion. For example, congestion is indicated in FIGS. 9-11 when the most frequently occurring UDRs (the mode, or peak of the curve) have a measured bandwidth value that is relatively close to the upper bound of the total bandwidth available in the channel or path. The total available bandwidth may represent, for example, a subscriber provisioned limit (i.e., a bandwidth limitation set by the Service Provider) or a predetermined capacity of a network device or link.

In some cases, the analysis results of a particular statistical distribution may indicate congested traffic flow conditions through a particular path (or route) of the network. As a result, a congested location may be isolated to that route when both the mode and the median indicate that the measured bandwidth becomes considerably less than the total bandwidth available to that route.

After the bandwidth distributions have been generated and analyzed, a method for isolating the location of congestion may begin in step 435 with a wide scope of route sets. By starting with a wide scope of route sets, the bandwidth distribution may examine all traffic from all sources headed to all destinations and metered by an observation point. If the observation point is located at UDR generating device 120 (also labeled GD in FIG. 1), for example, the observation point may constantly receive traffic from all of the distant nodes on the Internet (represented by the top row of circles in FIG. 1). The observation point may then forward the traffic to internal subscribers or systems (represented by R1 and R2 of FIG. 1). Since the method for isolating the location of congestion in a large network relies on the hierarchical structure of routing in the network, alternative observation points may be chosen in alternative network configurations.

At step 440, a decision is made based on previously named metrics that there is likely congestion occurring on one of the many paths through GD. If the decision at step 440 is Yes, then further analysis is performed in step 470 to ascertain whether the distribution is dominated by congestion or whether congestion is apparent in only a portion of the flows captured. If the second decision at step 470 is Yes, the initial algorithm terminates at step 490 after isolating a congested device in step 480. If the second decision at 470 is No, then the scope of routes coming into the GD is reduced in step 475 and the algorithm returns to step 440 to re-evaluate the spectrum of bandwidths for the next cycle of routes.

If the decision at step 440 is No, the algorithm determines that no congestion is visible within the current scope of routes in step 450. In step 460, it may be determined that the algorithm has narrowed the scope to far (i.e., to a route with no congestion), if congestion was observed at broader scopes. If this occurs, the algorithm will recall the previous higher and broader scope at step 465 and return to the beginning of the search process at step 440, where the algorithm will choose a different narrowing path. The algorithm will continue in this manner until certain criteria is met for completion of the algorithm at step 490.

An exemplary means for changing the scope of routes (in step 475) is performed by the congestion logic 150 of FIG. 2. The input stream of UDRs 159 is filtered by two dynamic route filters 151 and 152. Filter 151 filters out all source traffic except traffic of a specified source scope. Similarly filter 152 filters out all destination traffic except traffic of a specified source. The unfiltered traffic is then characterized by statistical model 135, and more specifically, by distribution model 153. The congestion probability is determined by the logic contained in block 154, which utilizes congestion probability thresholds obtained from block 156. Based on these parameters, block 155 decides whether to adjust the source and destination filters to obtain a wider or narrower scope of routes. At the completion of the algorithm defined earlier, the logic at block 155 obtains pertinent topology data and routing table data from block 157 and then generates results 158. As shown in FIG. 2, results 158 may include a description of the narrowest congested path (or paths) found, the devices most likely congested, and the congestion probabilities of the named devices.

Therefore, a precise location of the congested device may be resolved by pre-filtering the measured traffic, or in other words, by narrowing the source and destination route sets until the congested path (or paths) is found. The number of measurements required to pinpoint the congested device may be proportional to k log N, where N is the number of potential devices in the analysis set, and k is a constant.

As one aspect, the various embodiments of the invention eliminates the guesswork commonly used in conventional methods (which select a fixed threshold value based on personal experience, rule-of-thumb, etc.) by designating the threshold value as a percentage (or a probability of occurrence) of the total bandwidth available. In addition, the present method enables the threshold value to be chosen regardless of distribution shape; thus, no assumptions have to be made concerning whether the variable of interest (e.g., bandwidth utilization) is normally distributed, or distributed by any other mathematically derived means. As such, the various embodiments described herein provide a simple and reliable means for not only detecting the existence of congestion, but more importantly, for isolating the congestion location, or the network device or link responsible for generating the congestion.

The present method may also be applied to predict future occurrences of network congestion, even though current analysis results may indicate relatively normal traffic flow conditions. For example, current analysis results may be extrapolated to identify an observation point as a potential source of future network congestion. As such, the present method may be used to provide a more reliable means for capacity planning.

In general, "capacity planning" is the process of predicting tomorrow's needs and preparing for them today. Network capacity planning typically combines marketing information and traffic analysis results to predict future resource requirements (based, e.g., on predictions of future occurrences of network congestion). Network capacity planning has three phases: (1) predicting further growth in customers, (2) predicting future volume of traffic, and (3) planning resource upgrades to prepare for the future growth.

In traditional capacity planning methods, a marketing team would estimate how many new customers will join the service and how many old customers will leave the service to predict the future growth in customers. For example, the marketing team may use historical growth patterns, advertising budget, channel strength and customer satisfaction reviews, etc. to estimate future growth (typically in total number of customers). Next, network engineers would translate the estimated number of customers into possible network traffic to predict future volumes of traffic and to identify potential problem spots in the network. Once potential problem spots were identified, the Service Provider would decide where investments were needed to provide a reliable network service to customers. This process is clearly fraught with many disadvantages.

Therefore, the improved system and method may also be used to provide intelligent network capacity planning, which would enable a Service Provider to manage future data volume in a more efficient manner; thereby resulting in significant cost savings and increased customer satisfaction. To predict future growth, the present method may be used to ascertain how much of the data on each network path belongs to each customer segment. This may be done, in some cases, by observing the source/destination IP address of multiple UDRs, and then correlating the UDR addresses to corresponding customer segments (e.g., residential or business customers). A statistical distribution (e.g., a histogram) may then be generated to reflect the amount of bandwidth utilized by each customer segment and to study usage growth patterns over certain time intervals (e.g., 3 months, 6 months, 1 year, etc.). Standard mathematical techniques of extrapolation can then be used to estimate the volume of traffic that new customers are likely to generate. In this manner, the overall traffic growth can be estimated in a more objective manner by basing the estimation on actual statistical data, as opposed to the rule-of-thumb techniques used in most conventional methods.

The above discussion is meant to be illustrative of the principles and various embodiments of the present invention. Numerous variations and modifications will become apparent to those skilled in the art once the above disclosure is fully appreciated. For example, though exemplary embodiments of the present invention have been discussed in the context of analyzing high momentum data streams received from an Internet network device, the present invention may be equally applicable to substantially any type of data, which may be received from substantially any type of network at substantially any data stream rate. It is intended that the following claims be interpreted to embrace all such variations and modifications.

What is claimed is:

1. A method for analyzing a stream of usage detail records (UDRs), the method comprising:

receiving the stream of UDRs from an observation point within a network;

computing an amount of bandwidth utilized by each UDR as each UDR is received from the observation point;

generating a statistical distribution of the UDRs based on the amount of bandwidth utilized by each UDR; and analyzing the statistical distribution to detect a congested location associated with the observation point.

2. The method as recited in claim 1, wherein said receiving the stream of UDRs comprises receiving a plurality of UDRs from a network device associated with the observation point.

3. The method as recited in claim 1, wherein each of the UDRs is associated with a packet of information traveling between two points in the network.

4. The method as recited in claim 3, further comprising collecting relevant portions of each UDR as the UDR is received from the observation point.

5. The method as recited in claim 4, wherein the relevant portions comprise a packet volume, a travel start time and a travel end time.

6. The method as recited in claim 5, wherein said computing an amount of bandwidth comprises dividing the packet volume by a difference between the travel end time and the travel start time.

7. The method as recited in claim 1, wherein said generating a statistical distribution comprises applying a statistical model to each UDR as soon as its bandwidth utilization is computed.

8. The method as recited in claim 7, wherein the statistical model is selected from a group of models comprising a linear histogram, a log histogram, a probability distribution function and a cumulative distribution function.

9. The method as recited in claim 1, wherein said analyzing the statistical distribution comprises determining whether a majority of the bandwidth utilization in the statistical distribution is less than or equal to a percentage of total bandwidth available to the observation point.

10. The method as recited in claim 9, wherein the congestion location associated with the observation point is detected if a majority of the bandwidth utilization in the statistical distribution is less than or equal to the predetermined percentage.

11. The method as recited in claim 10, wherein the predetermined percentage is chosen from a range of percentages comprising about 50% to about 95%.

12. A method for detecting a congested location within a network, the method comprising:

collecting a stream of UDRs from a plurality of observation points within the network;

computing bandwidth utilization for each of at least a plurality of said UDRs as each such UDR is collected from the plurality of observation points;

generating a plurality of statistical distributions by grouping the UDRs by observation point and by computed bandwidth utilization; and detecting a congested location when a majority of the bandwidth utilization in at least one of the plurality statistical distributions is less than or equal to a predefined percentage of total bandwidth available to a corresponding observation point.

13. The method as recited in claim 12, wherein said collecting a stream of UDRs comprises obtaining the UDRs from one or more network devices arranged along a boundary of the network.

14. The method as recited in claim 12, wherein said generating a plurality of statistical distributions comprises applying a statistical model to each UDR as soon as its bandwidth utilization is computed.

15. The method as recited in claim 14, wherein the statistical model is a histogram comprising one or more bins each associated with a different range of bandwidth utilization.

16. The method as recited in claim 15, wherein said generating a plurality of statistical distributions further comprises creating additional bins, if needed, based on the bandwidth utilization of a recently collected UDR.

17. The method as recited in claim 16, further comprising updating a corresponding one of the plurality of statistical distributions to reflect the recently collected UDR.

18. The method as recited in claim 17, further comprising storing the plurality of statistical distributions in lieu of storing the stream of UDRs.

19. A system for analyzing a statistical distribution of a stream of UDRs, comprising:
   a data analysis system server coupled to a network, the data analysis system server comprising congestion logic;
   wherein the congestion logic generates the statistical distribution by grouping UDRs according to bandwidth utilization upon receiving the stream of UDRs from a network device; and
   wherein the congestion logic further analyzes the statistical distribution to determine if an observation point associated with the network device is a source of network congestion.

20. The system as recited in claim 19, wherein the network device comprises a routing device arranged on a boundary of the network.

21. The system as recited in claim 20, further comprising a data collection system coupled to the data analysis system server for collecting the stream of UDRs from the routing device.

22. The system as recited in claim 20, wherein the observation point comprises the routing device, an additional network device arranged within the network, or a link arranged between the routing device and the additional network device.

23. The system as recited in claim 20, further comprising a data storage system coupled to the data analysis system server for storing the statistical distribution in lieu of storing the stream of UDRs.

24. The system as recited in claim 20, further comprising a user interface coupled to the data analysis system server for displaying the statistical distribution and/or for displaying results of analyzing the statistical distribution.

25. A computer-readable storage medium having computer executable instructions for analyzing a statistical distribution of a stream of UDRs, the computer executable instructions comprising:
   first program instructions that cause a computer to generate the statistical distribution by grouping UDRs according to bandwidth utilization as the stream of UDRs is received from a network device; and
   second program instructions that cause the computer to analyze the statistical distribution to determine if an observation point associated with the network device is a source of network congestion.

26. The computer-readable storage medium as recited in claim 25, further comprising third program instructions for predicting future sources of network congestion based on extrapolated results obtained from execution of the first and second program instructions.

* * * * *

UNITED STATES PATENT AND TRADEMARK OFFICE
CERTIFICATE OF CORRECTION

PATENT NO.         : 7,571,181 B2
APPLICATION NO.    : 11/021956
DATED              : August 4, 2009
INVENTOR(S)        : Lee Rhodes It is certified that error appears in the above-identified patent and that said Letters Patent is hereby corrected as shown below:

On the Title Page Item (57), under Abstract, line 8, after "statistical" insert -- distribution --.

In column 2, line 11, delete "statistical" and insert -- statistical distribution --, therefor.

Signed and Sealed this

First Day of December, 2009

David J. Kappos
*Director of the United States Patent and Trademark Office*